(12) United States Patent
Love

(10) Patent No.: US 9,061,226 B2
(45) Date of Patent: Jun. 23, 2015

(54) FILTRATION METHOD WITH SELF-CLEANING FILTER ASSEMBLY

(71) Applicant: Johnny Leon Love, Hendersonville, NC (US)

(72) Inventor: Johnny Leon Love, Hendersonville, NC (US)

(*) Notice: Subject to any disclaimer, the term of this patent is extended or adjusted under 35 U.S.C. 154(b) by 6 days.

(21) Appl. No.: 14/154,670

(22) Filed: Jan. 14, 2014

(65) Prior Publication Data

US 2014/0124431 A1    May 8, 2014

Related U.S. Application Data

(62) Division of application No. 12/875,519, filed on Sep. 3, 2010, now Pat. No. 8,647,516.

(51) Int. Cl.
| | |
|---|---|
| *B01D 33/50* | (2006.01) |
| *B01D 33/073* | (2006.01) |
| *B01D 33/56* | (2006.01) |
| *B01D 33/54* | (2006.01) |
| *B01D 33/39* | (2006.01) |
| *B01D 33/27* | (2006.01) |

(52) U.S. Cl.
CPC ............. *B01D 33/50* (2013.01); *B01D 33/56* (2013.01); *B01D 33/073* (2013.01); *B01D 33/54* (2013.01); *B01D 33/39* (2013.01); *B01D 33/275* (2013.01); *B01D 2201/085* (2013.01)

(58) Field of Classification Search
None
See application file for complete search history.

(56) References Cited

U.S. PATENT DOCUMENTS

| | | | | |
|---|---|---|---|---|
| 1,649,220 A | * | 11/1927 | Goodloe | 55/290 |
| 1,944,267 A | * | 1/1934 | Rathbun | 55/294 |
| 1,950,466 A | * | 3/1934 | Wille et al. | 210/392 |
| 1,968,741 A | * | 7/1934 | Burrell | 210/392 |
| 2,009,382 A | | 7/1935 | Blaufuss | |
| 2,440,384 A | * | 4/1948 | Schenke | 210/87 |
| 2,835,390 A | * | 5/1958 | King | 210/411 |
| 3,074,560 A | * | 1/1963 | Kinney | 210/330 |
| 3,168,467 A | * | 2/1965 | Dreyer | 210/108 |
| 3,221,886 A | * | 12/1965 | Lamort | 210/298 |
| 3,338,416 A | * | 8/1967 | Barry | 210/297 |
| 3,345,805 A | * | 10/1967 | Sherrill | 96/424 |
| 3,347,379 A | * | 10/1967 | Miller | 210/127 |
| 3,357,566 A | * | 12/1967 | Schmid et al. | 210/333.01 |
| 3,574,509 A | * | 4/1971 | Zentis et al. | 210/107 |
| 3,759,392 A | * | 9/1973 | Syrjanen | 210/415 |
| 3,834,535 A | * | 9/1974 | Portyrata | 210/778 |
| 3,865,243 A | * | 2/1975 | Salminen | 209/240 |

(Continued)

FOREIGN PATENT DOCUMENTS

FR      2550710      2/1985

OTHER PUBLICATIONS

Supplementary European Search Report, Feb. 27, 2014, EP. 11 82 2765.

*Primary Examiner* — Robert James Popovics
(74) *Attorney, Agent, or Firm* — Timothy J. Monahan; Monahan & Company, LLC

(57) ABSTRACT

A filter assembly and method of filtering a fluid containing particulates is provided having a filter element mounted on a horizontal mandrel, whereby the filter element and mandrel are rotatable within a housing during a self-cleaning step, wherein the filter element is immersed and agitated in a cleaning liquid followed by high speed rotation while a rinsing liquid is delivered to the core of the filter element. An ultrasonic transducer in the housing may be activated while the filter element is immersed in the cleaning liquid to assist in removing accumulated particulates from the filter element.

20 Claims, 5 Drawing Sheets

(56) References Cited

U.S. PATENT DOCUMENTS

| | | | |
|---|---|---|---|
| 3,983,036 A * | 9/1976 | Lauzeral et al. | 210/356 |
| 4,042,504 A * | 8/1977 | Drori | 210/107 |
| 4,215,447 A * | 8/1980 | Gartland et al. | 8/156 |
| 4,261,822 A * | 4/1981 | Richardson | 210/107 |
| 4,297,209 A * | 10/1981 | DeVisser et al. | 210/107 |
| 4,306,975 A * | 12/1981 | Siewert | 210/394 |
| 4,346,008 A * | 8/1982 | Leighton et al. | 210/395 |
| 4,379,058 A * | 4/1983 | Bolton | 210/791 |
| 4,450,080 A * | 5/1984 | Dodd | 210/391 |
| 4,610,786 A * | 9/1986 | Pearson | 210/236 |
| 4,643,828 A * | 2/1987 | Barzuza | 210/412 |
| 4,655,910 A * | 4/1987 | Tabor | 210/107 |
| 4,655,911 A * | 4/1987 | Tabor | 210/107 |
| 4,692,247 A * | 9/1987 | Orlans | 210/314 |
| 4,702,847 A * | 10/1987 | Fux et al. | 210/798 |
| 4,725,292 A * | 2/1988 | Williams | 95/278 |
| 4,780,151 A * | 10/1988 | Barzuza | 134/21 |
| 4,818,402 A * | 4/1989 | Steiner et al. | 210/411 |
| 4,859,335 A * | 8/1989 | Whyte | 210/393 |
| 4,867,879 A * | 9/1989 | Muller | 210/392 |
| 4,875,913 A * | 10/1989 | Barzuza | 55/294 |
| 4,898,671 A * | 2/1990 | Fux et al. | 210/333.01 |
| 4,923,600 A * | 5/1990 | Krofta | 210/107 |
| 5,087,365 A * | 2/1992 | Davis et al. | 210/415 |
| 5,152,891 A * | 10/1992 | Netkowicz et al. | 210/408 |
| 5,164,079 A * | 11/1992 | Klein | 210/186 |
| 5,183,568 A * | 2/1993 | Lescovich | 210/360.1 |
| 5,192,429 A * | 3/1993 | Bader | 210/170.09 |
| 5,215,656 A * | 6/1993 | Stoneburner | 210/170.09 |
| 5,246,580 A * | 9/1993 | Stedfeldt | 210/407 |
| 5,250,198 A * | 10/1993 | Stedfeldt | 210/797 |
| 5,268,095 A * | 12/1993 | Barzuza | 210/143 |
| 5,356,532 A * | 10/1994 | Wilkins et al. | 210/107 |
| 5,384,045 A * | 1/1995 | Chmielewski et al. | 210/354 |
| 5,464,542 A * | 11/1995 | Grienberger et al. | 210/784 |
| 5,514,270 A * | 5/1996 | Barzuza | 210/356 |
| 5,520,808 A * | 5/1996 | Stoneburner et al. | 210/380.1 |
| 5,575,911 A * | 11/1996 | Rosenberg | 210/333.01 |
| 5,587,074 A * | 12/1996 | Lynch et al. | 210/411 |
| 5,595,655 A * | 1/1997 | Steiner et al. | 210/391 |
| 5,632,903 A * | 5/1997 | Caracciolo, Jr. | 236/741 |
| 5,667,683 A * | 9/1997 | Benian | 210/409 |
| 5,824,229 A * | 10/1998 | Larkey et al. | 210/741 |
| 5,855,794 A * | 1/1999 | Caracciolo, Jr. | 210/739 |
| 5,900,158 A * | 5/1999 | Ruokolainen et al. | 210/772 |
| 5,925,155 A * | 7/1999 | Rodgers | 55/282 |
| 5,951,878 A * | 9/1999 | Astrom | 210/791 |
| 6,090,298 A * | 7/2000 | Weis | 210/780 |
| 6,103,132 A * | 8/2000 | Seyfried et al. | 210/791 |
| 6,156,213 A * | 12/2000 | Dudley et al. | 210/791 |
| 6,267,879 B1 * | 7/2001 | Gil | 210/107 |
| 6,318,562 B1 * | 11/2001 | Wilkie et al. | 210/355 |
| 6,337,013 B1 * | 1/2002 | Koopmans et al. | 210/232 |
| 6,398,037 B1 * | 6/2002 | Sadan et al. | 210/352 |
| 6,419,826 B1 * | 7/2002 | Lara et al. | 210/304 |
| 6,543,624 B1 * | 4/2003 | Geisbauer | 210/411 |
| 6,572,763 B2 * | 6/2003 | Gorshing | 210/159 |
| 6,959,818 B2 * | 11/2005 | Olson | 210/411 |
| 7,055,699 B2 * | 6/2006 | Takatsuka | 210/408 |
| 7,083,735 B2 * | 8/2006 | Laing | 210/791 |
| 7,097,046 B2 * | 8/2006 | Calabrese | 210/391 |
| 7,097,740 B2 * | 8/2006 | Vuorinen | 162/243 |
| 7,192,528 B2 * | 3/2007 | Prochaska et al. | 210/798 |
| 7,258,238 B2 * | 8/2007 | Raghupathy | 210/411 |
| 7,537,689 B2 * | 5/2009 | Ricketts | 210/107 |
| 7,581,649 B2 * | 9/2009 | Ben-Horin | 210/411 |
| 7,678,284 B2 * | 3/2010 | Ricketts | 210/791 |
| 7,807,050 B2 * | 10/2010 | Baumann et al. | 210/107 |
| 7,820,062 B2 * | 10/2010 | Ricketts | 210/791 |
| 7,833,424 B1 * | 11/2010 | Baumann et al. | 210/791 |
| 7,871,527 B2 * | 1/2011 | Smith et al. | 210/791 |
| 7,913,855 B2 * | 3/2011 | Ros Roca | 210/411 |
| 7,981,290 B2 * | 7/2011 | Baumann et al. | 210/333.1 |
| 8,028,841 B2 * | 10/2011 | Olson | 210/411 |
| 8,048,296 B2 * | 11/2011 | Stevens | 210/107 |
| 8,192,624 B2 * | 6/2012 | Takao et al. | 210/338 |
| D680,616 S * | 4/2013 | Ben-Horin et al. | D23/209 |
| 8,496,117 B2 * | 7/2013 | Leath, III | 210/373 |
| 8,524,075 B1 * | 9/2013 | Quintel | 210/108 |
| 8,524,082 B2 * | 9/2013 | Wiemers et al. | 210/321.67 |
| 8,647,516 B2 * | 2/2014 | Love | 210/798 |
| 8,778,174 B2 * | 7/2014 | Xia et al. | 210/108 |
| 8,821,720 B2 * | 9/2014 | Lee et al. | 210/107 |
| 2001/0054591 A1 * | 12/2001 | Gorshing | 210/769 |
| 2002/0008068 A1 * | 1/2002 | Anderson | 210/741 |
| 2003/0111430 A1 * | 6/2003 | Benenson et al. | 210/791 |
| 2004/0094470 A1 * | 5/2004 | Jackson | 210/411 |
| 2004/0112825 A1 * | 6/2004 | Villares Lenz Cesar | 210/391 |
| 2004/0112846 A1 * | 6/2004 | Jackson | 210/798 |
| 2004/0159617 A1 * | 8/2004 | Benenson et al. | 210/791 |
| 2005/0000870 A1 * | 1/2005 | Ricketts | 210/107 |
| 2005/0045568 A1 * | 3/2005 | Laing | 210/791 |
| 2005/0082209 A1 * | 4/2005 | Raghupathy | 210/107 |
| 2005/0139557 A1 * | 6/2005 | Ricketts | 210/791 |
| 2005/0194326 A1 * | 9/2005 | Calabrese | 210/798 |
| 2005/0279680 A1 * | 12/2005 | Jackson | 210/158 |
| 2006/0043014 A1 * | 3/2006 | Takatsuka | 210/411 |
| 2007/0199885 A1 * | 8/2007 | Shmuel et al. | 210/427 |
| 2007/0210015 A1 * | 9/2007 | Egan, III | 210/787 |
| 2008/0047885 A1 * | 2/2008 | Shiekelmacher | 210/107 |
| 2008/0053889 A1 * | 3/2008 | Leath | 210/403 |
| 2009/0026152 A1 * | 1/2009 | Collins et al. | 210/791 |
| 2009/0050582 A1 * | 2/2009 | Gil | 210/798 |
| 2009/0178976 A1 * | 7/2009 | Stevens | 210/741 |
| 2010/0206823 A1 * | 8/2010 | Ricketts | 210/791 |
| 2010/0213142 A1 * | 8/2010 | Andersson et al. | 210/784 |
| 2011/0031177 A1 * | 2/2011 | Ricketts | 210/236 |
| 2011/0303591 A1 * | 12/2011 | Lee et al. | 210/106 |
| 2012/0055887 A1 * | 3/2012 | Love | 210/798 |
| 2012/0091065 A1 * | 4/2012 | Xia et al. | 210/702 |
| 2012/0111788 A1 * | 5/2012 | Leath, III | 210/409 |
| 2012/0223028 A1 * | 9/2012 | Dagan | 210/791 |
| 2013/0026111 A1 * | 1/2013 | Gil et al. | 210/791 |
| 2013/0032515 A1 * | 2/2013 | Carayon | 210/158 |
| 2013/0048553 A1 * | 2/2013 | Kuk et al. | 210/411 |
| 2013/0087495 A1 * | 4/2013 | Riggers | 210/415 |
| 2013/0270163 A1 * | 10/2013 | Zur et al. | 210/138 |
| 2013/0306546 A1 * | 11/2013 | Cartarius et al. | 210/411 |
| 2013/0319953 A1 * | 12/2013 | Ozawa et al. | 210/747.6 |
| 2014/0021125 A1 * | 1/2014 | Luo et al. | 210/332 |
| 2014/0097145 A1 * | 4/2014 | Browning | 210/780 |
| 2014/0116965 A1 * | 5/2014 | Cote | 210/784 |
| 2014/0124431 A1 * | 5/2014 | Love | 210/330 |
| 2014/0231320 A1 * | 8/2014 | Lee et al. | 210/108 |
| 2015/0053628 A1 * | 2/2015 | Dale et al. | 210/798 |

* cited by examiner

FILTRATION METHOD WITH SELF-CLEANING FILTER ASSEMBLY

This invention relates to a method of filtering particulate material from a fluid, using a filter assembly that is capable of performing a self-cleaning step to regenerate the filter. The subject filtration method materially enhances the quality of the environment by contributing to the restoration and maintenance of air and water and materially contributes to the more efficient utilization and conservation of energy resources.

BACKGROUND OF THE INVENTION

Various techniques have been adopted for removing accumulated particulate matter from the surface of a filter element, in order to regenerate the filter.

Clapper, U.S. Pat. No. 4,299,245 discloses an ex-situ cleaning apparatus. The filter to be cleaned is removed, placed in the apparatus and sprayed with a cleaning solution via external and internal spray bars, while the filter is rotated. Another ex-situ filter cleaning apparatus is disclosed in Stuckey, U.S. Pat. No. 7,282,086 B2. A cleaning fluid is injected into the interior of the filter, while the filter is rotated, whereby the cleaning fluid is forced through the filter by centrifugal force.

Apparatus for in-situ cleaning of filters are disclosed in Dudley et al., U.S. Pat. No. 6,156,213 and Clary, U.S. Pat. No. 6,874,641 B2. Cleaning water is sprayed against the surface of the filter element, causing the filter element to rotate, during a regeneration step.

Benenson, Jr. et al., U.S. Pat. No. 6,861,004 B2 disclose a self-cleaning water filter employing a variety of cleaning techniques, including a reverse flow of clean water, a brush or scraper to dislodge accumulated particulate matter on the outer surface of the filter, and an ultrasonic generator suspended in the hollow interior of the filter. The ultrasonic generator may be activated during the cleaning step, when the clean water is flowing in reverse through the filter element.

Self-cleaning filter apparatus employing centrifugal force during an in-situ cleaning cycle are disclosed in the following references. Bergdahl, U.S. Pat. No. 4,130,404 discloses a fluid filter, which undergoes a cleaning cycle during which the flow of fluid is reversed while the filter is simultaneously spun at high speed. A cleaning fluid may be sprayed into the core of the filter element, while it is spun. Self-cleaning filter apparatus employing centrifugal force are also disclosed in Grotto, U.S. Pat. No. 4,222,755 and Dudley, U.S. Pat. No. 6,569,218 B2.

Another self-cleaning filter employing centrifugal force is disclosed in EP 0 993 853 A2. A series of disc filters are mounted on a shaft. During cleaning, the fluid flowing from the pump is diverted to the impeller of a vane turbine, which in turn causes the shaft to rotate. The centrifugal force generated by rotation of the shaft detaches sediment from the surface of the disc filters.

Self-cleaning filters in which particulate matter filtered from a fluid stream collects on the inside of the filter element are disclosed in Caracciolo, Jr., U.S. Pat. No. 5,855,794 and Shiekelmacher, US 2008/0047885 A1. During the cleaning step, the filter is backwashed, while cleaning heads traverse the inside of the filter element to remove collected particulate matter.

Despite the attempts to develop methods and apparatus for cleaning filters, there remains a need for a self-cleaning filter with improved performance, while conserving resources and energy.

SUMMARY OF THE INVENTION

The present invention is directed to both a method of filtering a fluid containing particulates and a self-cleaning filter assembly that is particularly useful for practicing the subject method. The fluid may be a liquid or a gas, or a mixture of a liquid and a gas.

The filter assembly has a housing forming the outer shell around a hollow core filter element. The filter element has an exterior surface, on the housing side of the filter element, and an interior surface, on the core side of the filter element. Means are provided to mount the filter element inside the housing, so that the filter element may be rotated relative to the housing by a motor. A means for delivering a rinsing liquid to the core of the filter element, while the filter element is rotating, is also provided. The rinsing liquid delivery means may be a spray bar, extending substantially the length of the filter element. During the self-cleaning process, the rinsing liquid is distributed to the interior surface of the filter element and the centrifugal force created by rotating the filter element drives the rinsing liquid from the interior surface to the exterior surface of the filter element, thereby removing accumulated particulates on the exterior surface.

In one embodiment of the invention, the filter element is mounted on a perforated, hollow mandrel, such that both the filter element and mandrel may be rotated together relative to the housing, by the motor. The spray bar for delivering the rinsing liquid may be positioned inside the hollow mandrel, and the spray bar secured in a fixed position, while the mandrel and filter element are rotated during self-cleaning.

Another feature that may be included in the filter assembly is an ultrasonic transducer for creating ultrasonic vibrations that are transmitted by a liquid medium, such as a cleaning liquid, to the filter element, to dislodge accumulated particulates. In one embodiment of the invention, the ultrasonic transducer is located inside the housing and outside the exterior surface of the filter element, so as to be submerged in a cleaning liquid introduced into the housing. The ultrasonic transducer is particularly useful in dislodging accumulated particulates in microfiltration, for example, in removing particulates having a mean particle size of 5 microns or less.

In one embodiment of the invention, the filter element is cylindrical and the axis of the filter element is aligned horizontally. The housing is also aligned horizontally, with at least the lower half of the housing conforming to the cylindrical shape of the filter element. Alternatively, both the upper and lower halves of the housing may be cylindrical in shape, thereby minimizing waste and energy use. An inclined trough may be incorporated into the lowest region of the housing, for draining the housing during the self-cleaning process of unfiltered fluid, cleaning liquid containing dislodged particulates and/or rinsing fluid.

The filter assembly includes piping, valves, controls and reservoirs of a cleaning liquid and a rinsing liquid, to practice the method set forth herein. In particular, a discharge manifold is provided, which is in fluid communication with the end of the mandrel, for receiving the filtrate that passes through the filter element and mandrel, during the filtration step. Vents may be provided in the filter assembly, especially in the housing, to release trapped gas.

Seals are useful, especially during the filtration step, between the housing and any rotating components. For example, at least one end of the mandrel may extend through the housing, to deliver filtrate from inside the housing to the discharge manifold, and to engage a motor positioned outside of the housing. In one embodiment of the invention, a hydraulic or pneumatic pressurized seal encircles the mandrel. The seal may be pressurized during filtration, to contain a fluid under pressure inside the housing. And, the seal may be depressurized during self-cleaning, to allow the mandrel to rotate relative to the housing. A pair of seals may be used, one at either end of the mandrel, for designs in which both ends of the mandrel are in fluid communication with the discharge manifold.

The method of the present invention includes filtration of a fluid containing particulates, to create a filtrate, and self-cleaning of the filter element. The fluid is introduced into the housing of the filter assembly and outside of the exterior surface of the filter element. A pressure differential is created across the filter element, for example, by pumping the fluid through an inlet manifold and into the housing at a pressure significantly greater than atmospheric pressure, or creating a vacuum at the filtrate discharge manifold. The particulates accumulate on the exterior surface and in the interstices of the filter element and the filtrate passes through the filter element, out of the housing and through the discharge manifold. In one embodiment of the invention, the filtrate passes through perforations and into the hollow interior of a mandrel, before passing through the discharge manifold.

When the filter element is ready for cleaning, typically indicated by an increase in fluid pressure and/or a decrease in filtration rate, the flow of fluid into the housing is stopped. In one embodiment of the invention, the unfiltered fluid in the housing is drained out. Next, a cleaning liquid is provided in the housing, at a level sufficient to at least partially submerge the filter element. The cleaning liquid is formulated to assist in loosening, dislodging or dissolving the particulates accumulated on the exterior surface and interstices of the filter element.

The filter element is agitated in the cleaning liquid, during the self-cleaning process. The term "agitation" is intended to include continuous rotation of the filter element, intermittent rotation of the filter element followed by soaking, and rotation of the filter element in alternating directions, as well as combinations of the foregoing methods. In one embodiment of the invention, the agitation includes longitudinal displacement of the filter element, such as reciprocation along the axis of the filter element.

An ultrasonic transducer may be activated while the filter element is soaking or being agitated in the cleaning liquid, to dislodge accumulated particulates. Since the ultrasonic energy transmitted to the exterior surface and interstices of the filter element is inversely related to the volume of the cleaning liquid, it is believed to be advantageous for one-half or less of the filter element to be submerged in the cleaning liquid when the ultrasonic transducer is activated.

The cleaning liquid containing dislodged and/or dissolved particulates is drained from the housing. The filter element is then rotated while delivering a rinsing liquid to the interior surface of the filter element. The filter element is rotated at sufficient speed to drive the rinsing liquid through the filter element by centrifugal force. The rinsing liquid passing through the filter element removes remaining particulates and rinses the cleaning liquid from the filter element. The rinsing liquid is flung against the inside of the housing and may be drained from the bottom of the housing by gravity. In one embodiment, the rinsing liquid is delivered by the spray bar described herein.

Once the self-cleaning process has been completed, the drains are closed and filtration of the fluid begins again. While in some instances the filter element may be rotated during the filtration step, for example in the case of low flow rates of fluids containing particulates prone to settling, generally it is believed to be beneficial to hold the filter element stationary, especially in conjunction with the use of pressurized seals.

The advantages of the various embodiments of the present invention include efficient regeneration of a filter element, minimal liquid waste for disposal, optimal use of ultrasonic energy for cleaning, compatibility with pleated filters to maximize filter area, in-situ cleaning of a filter element without the need to backwash, and the use of cleaning and rinsing liquids having different compositions than the fluid being filtered.

DETAILED DESCRIPTION OF THE INVENTION

Without intending to limit the scope of the invention, the preferred embodiments and features are hereinafter set forth. Unless otherwise indicated: all parts and percentages are by weight and conditions are ambient, i.e. one atmosphere of pressure, 25° C. and 50% relative humidity. Mean particulate size is the mean volume diameter as measured by laser light diffraction. All of the United States patents cited in the specification are hereby incorporated by reference.

Filtration Process

Figure 1:
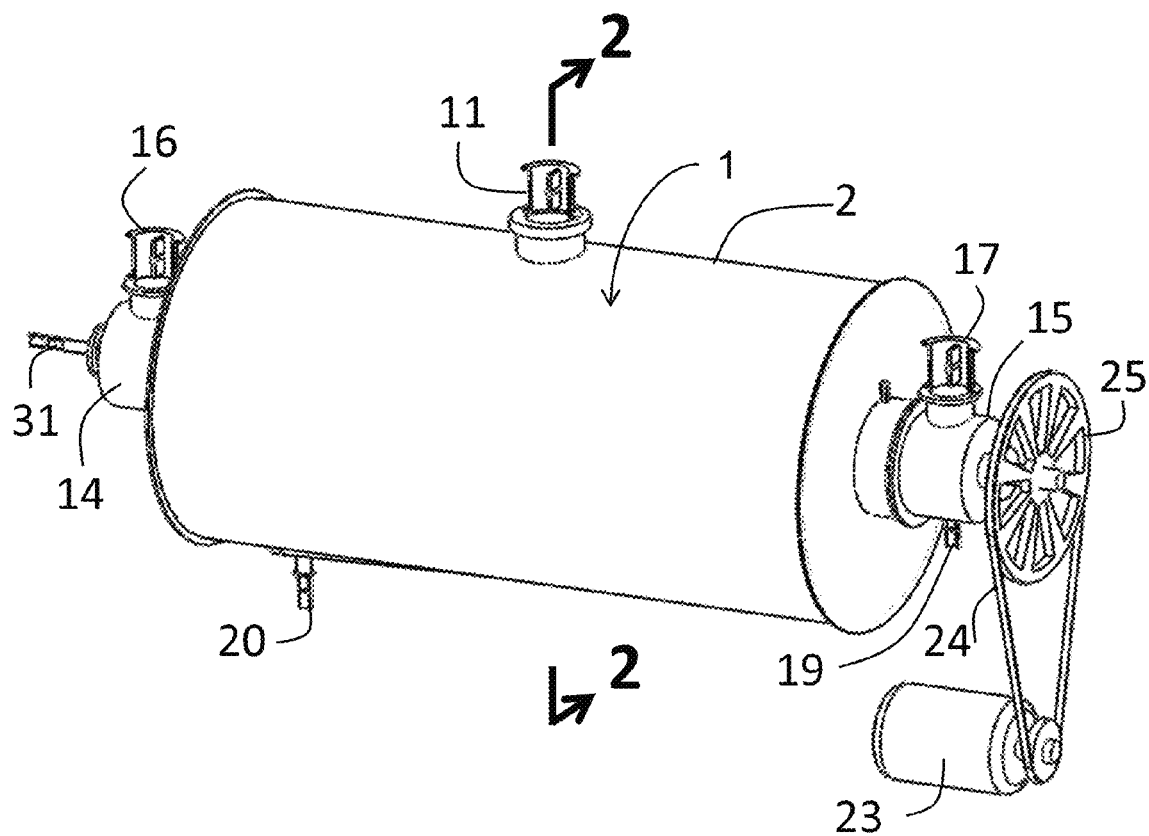
FIG. 1 is a perspective view of the filter assembly.
Figure 2:
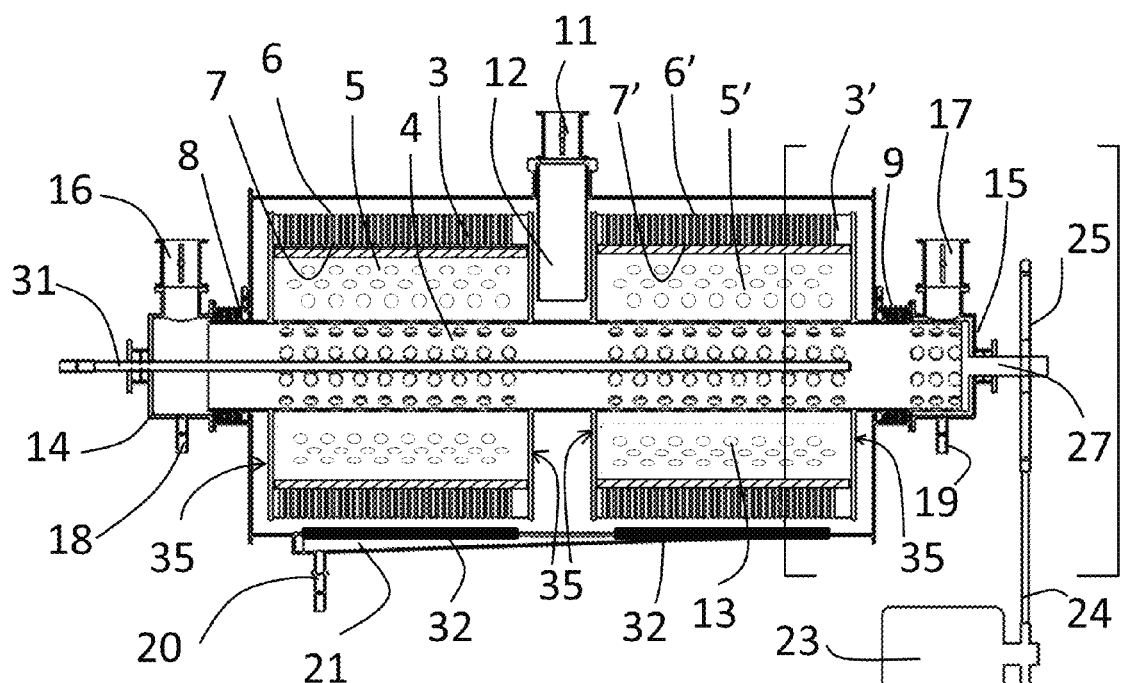
FIG. 2 is a side cross-sectional view of the filter assembly.

Referring to FIGS. 1 and 2, filter assembly 1 has housing 2 with filter elements 3 and 3', mounted on mandrel 4. Filter elements 3 and 3' are mounted on filter cores 5 and 5', respectively. Filter elements 3 and 3', respectively, each have an exterior surface 6 and 6' facing housing 2, and an interior surface 7, 7' facing mandrel 4.

Various filter media may be used in filter elements 3 and 3'. For example, the filter media may be a woven, knitted or non-woven textile comprised of natural fibers, synthetic fibers or metal wire, or mixtures thereof, or a porous substrate, such as sintered metal, ceramic, graphite, thermosetting polymer or thermoplastic polymer. The porous substrate may be tubular, such as a hollow fiber, spiral, a membrane or a sheet. In one embodiment of the invention, the filter element is a pleated sheet, that is, the sheet has a folded or sinusoidal profile to increase the available surface area for filtering. By way of example, the pleated sheet may be constructed to provide a depth of at least ½ inch.

As shown in FIG. 2, filter elements 3 and 3' have a cylindrical, hollow shape and are aligned horizontally, as is mandrel 4. It has been found to be advantageous to position the filter elements and the mandrel in co-axial alignment, so that the components are balanced for high speed rotation. While two separate filter elements are shown in the drawings, the present invention may be practiced with one, two, three or more filter elements mounted on a mandrel. Furthermore, it may be understood that in an embodiment of the invention employing a single filter element, the filter element may be provided with a core that is sufficiently rigid to serve as the functional equivalent of the mandrel.

Housing 2 is shaped to conform to the filter elements, while leaving sufficient space for circulation of a fluid to be filtered between housing 2 and the exterior surface 6 and 6' of the filter elements. Accordingly, housing 2 may be advantageously provided with a cylindrical shape and aligned horizontally with the filter elements. It can be understood, however, that many of the benefits of the invention, especially with regard to cleaning efficiency and minimization of waste, can be achieved if just the lower one-half of the housing is cylindrical.

Figure 3:
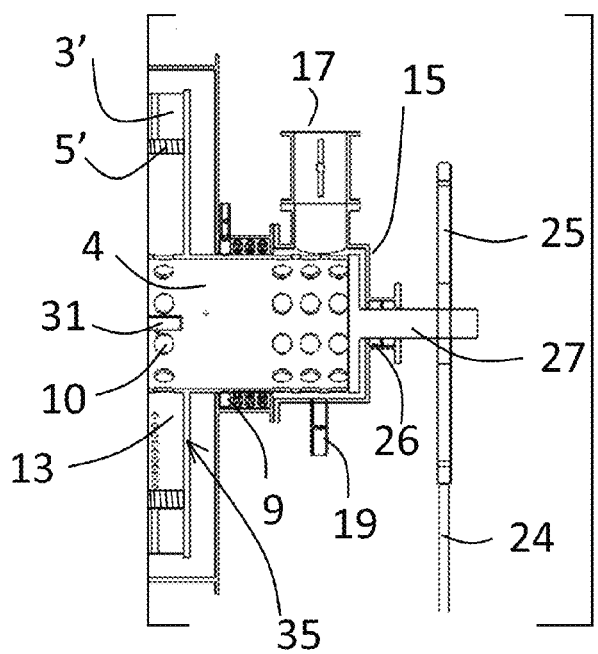
FIG. 3 is a side cross-sectional view showing details of the seal around the mandrel.

Mandrel 4 is a means to mount the filter elements inside the housing whereby the filter elements may be rotated relative to the housing. Mandrel 4 can be rotatably mounted in housing 2 with suitable bearing, such as hydraulic pressure lubricated seals mounted on the housing or domes 14 and 15. Referring to FIGS. 2 and 3, seals 8 and 9 are provided at the locations where the ends of mandrel 4 extend through housing 2. The seals may be hydraulic or pneumatic pressurized seals, such as are used in marine stuffing boxes and available from Duramax Marine, LLC, Hiram, Ohio, USA. During filtration, the seals are pressurized to prevent unfiltered fluid from being discharged from the housing and/or mixing with the filtrate. During the self-cleaning process, the seals are depressurized, to allow mandrel 4 to rotate.

Mandrel 4 is perforated to allow filtrate to flow through the filter elements, through the hollow interior of mandrel 4 and out of housing 2. The term "perforated" is intended to be construed broadly to include openings through mandrel 4, regardless of how the openings are created, which are sufficient in size and number to allow the passage of the filtrate and, in certain embodiments of the invention, to allow a rinsing liquid, and optionally cleaning liquid, released inside the mandrel to be dispersed into the interior of the filter element. Thus, by way of example, the perforations 10, shown in FIGS. 2 through 5, may be punched, drilled or made by casting. Furthermore, the perforations are not intended to be limited to a particular shape and may be circular, slots or mesh.

The fluid containing particulates is introduced into housing 2 via inlet manifold 11, which includes inlet pipe 12 extending into the space between filter elements 3 and 3'. It is believed that a more uniform distribution of fluid to be filtered is achieved when pipe 12 extends into the interior of the housing such that the distance between the opening of inlet pipe 12 and mandrel 4 is less than the distance between the outside diameter of element 3 or 3' and mandrel 4.

During the filtration step, the particulates accumulate on the exterior surface 6 and 6' of filter elements 3 and 3', as well as in the interstices of the filter element. The filtrate passes through filter elements 3 and 3', into the hollow interior 13 of the filter elements, and into mandrel 4. At least one end of the mandrel is in fluid communication with a discharge manifold for receiving the filtrate from the inside of housing 2. The filtrate flows out of the ends of mandrel 4 and into domes 14 and 15, and out discharge pipes 16 and 17, respectively. Dome drains 18 and 19 are provided to drain the domes during the self-cleaning process or for maintenance.

At the end of the filtration process and during the self-cleaning cycle, fluids can be drained from housing 2 via housing drain 20, positioned at the lower end of inclined trough 21. Trough 21 is incorporated into the bottom of housing 2, and liquid to be drained from the housing is gravity fed into the trough, thereby minimizing accumulation and avoiding cross-contamination of the fluids being filtered, cleaning liquid and rinsing liquid.

Self-Cleaning Process

The cleaning cycle involves the steps of stopping the flow of fluid to be filtered into the housing, providing a cleaning liquid inside the housing at a level sufficient to at least partially submerge the filter element; agitating the filter element in the cleaning liquid to dislodge accumulated particulates on the exterior surface of the filter element; draining the cleaning liquid and particulates dislodged from the filter element from the housing; and rotating the filter element while delivering a rinsing liquid to the interior surface of the filter element, whereby the rinsing liquid is driven from the interior surface to the exterior surface of the filter element by centrifugal force.

Figure 4:
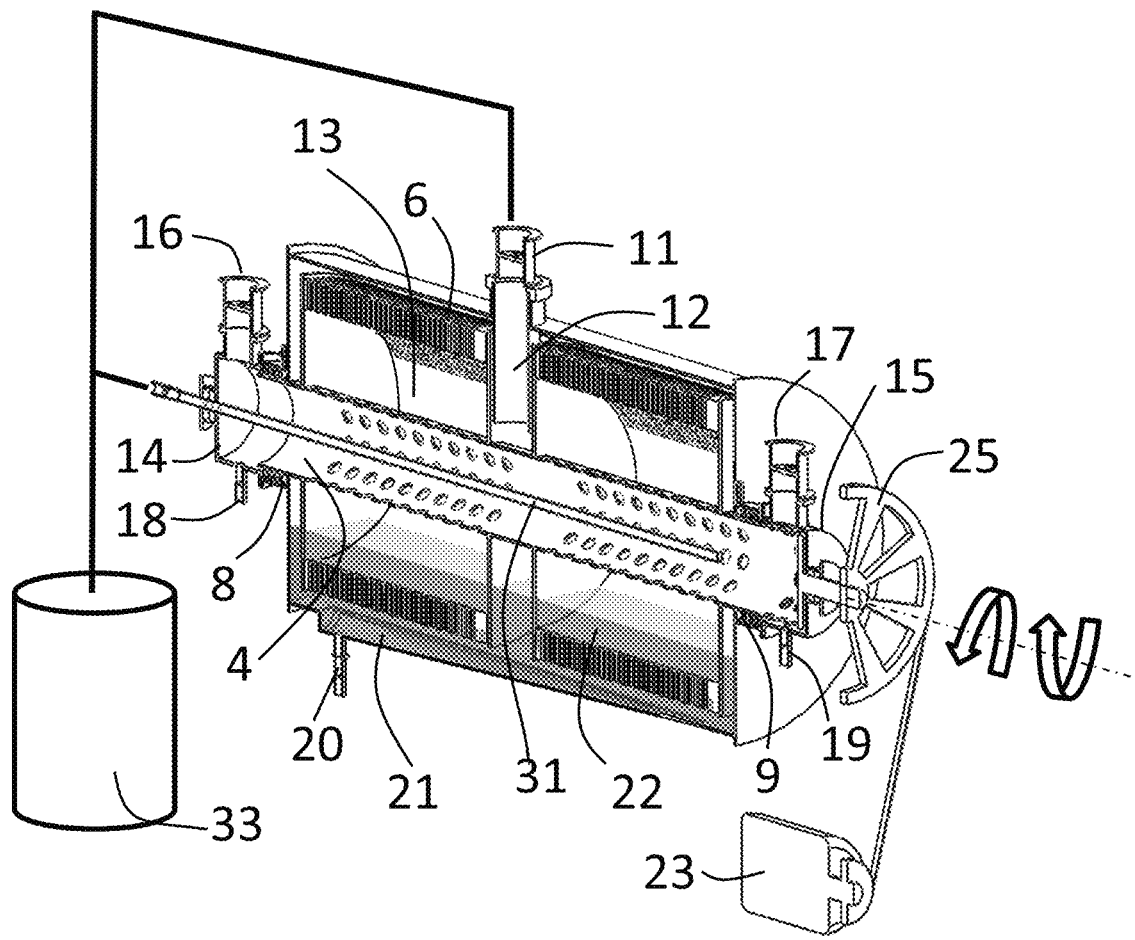
FIG. 4 is a cut-away perspective view of the filter assembly showing the filter element agitated in a cleaning liquid.

Referring to FIG. 4, a cleaning liquid 22 is provided in housing 2 at a level below the seals 8 and 9. The cleaning liquid may be introduced via inlet manifold 11. In one embodiment of the invention, the cleaning liquid is introduced into housing 2, via spray bar 31, positioned in mandrel 4 and extending the length of the filter elements. Optionally, the cleaning liquid may be introduced via spray bar 31 while the filter elements are rotated at high speed, thereby generating sufficient centrifugal force to cause the cleaning liquid to pass through the filter elements and the accumulated particulates on the exterior surface and interstices of the filter elements. The cleaning liquid collects in the bottom of housing 2. At such time that the collected cleaning liquid begins to create resistance to and interfere with rotation of the filter elements, rotation of the filter elements can be stopped and the charge of cleaning liquid can be completed. It is believed that under certain conditions, forcing the cleaning liquid through the accumulated particulates, such as a filter cake, can significantly reduce the self-cleaning cycle.

By way of example, the cleaning liquid may be an aqueous or organic solvent or mixtures thereof, and may contain a surfactant, dispersant or binding agent, to assist in removing the particulates from the filter element. The cleaning liquid may be a solvent or an acidic or basic solution, selected to dissolve the accumulated particulates, without damaging the filter element. It is also within the scope of the invention to retain unfiltered fluid (liquid) in the housing for use as the cleaning liquid, either as is or with the addition of a compound to assist in removing particulates, such as a solvent, surfactant, acid or base.

It can be understood that the cleaning liquid may not fill the entire housing. In fact, substantial benefits may be realized when one-half or less of the filter element is submerged in the cleaning liquid. In particular, when the filter element is cylindrical and its axis is aligned substantially horizontally, the filter element may be rotated so that during the self-cleaning process the entire filter element will have been submerged in the cleaning liquid, without the need to fill the entire housing with the cleaning liquid. In alternative embodiments of the invention, one-third or less, or even one-fourth or less of the filter element is submerged in the cleaning liquid. Additionally, it is advantageous to operate at a level of cleaning liquid that is below the seals employed to seal between the mandrel and housing during filtration, thereby allowing the seals to be de-pressurized and the filter element to rotate in the cleaning fluid.

The filter element may be agitated in cleaning liquid 22 by electric motor 23, mechanically linked to mandrel 4, by belt 24 and pulley 25. A seal 26 is provided between dome 15 and shaft 27. The term motor is intended to include devices for imparting rotational and/or longitudinal displacement of the filter elements. By way of example, the motor may be an electric motor, internal-combustion engine or a combination of a pump and turbine. The motor may be positioned outside of housing 2.

Figure 5:
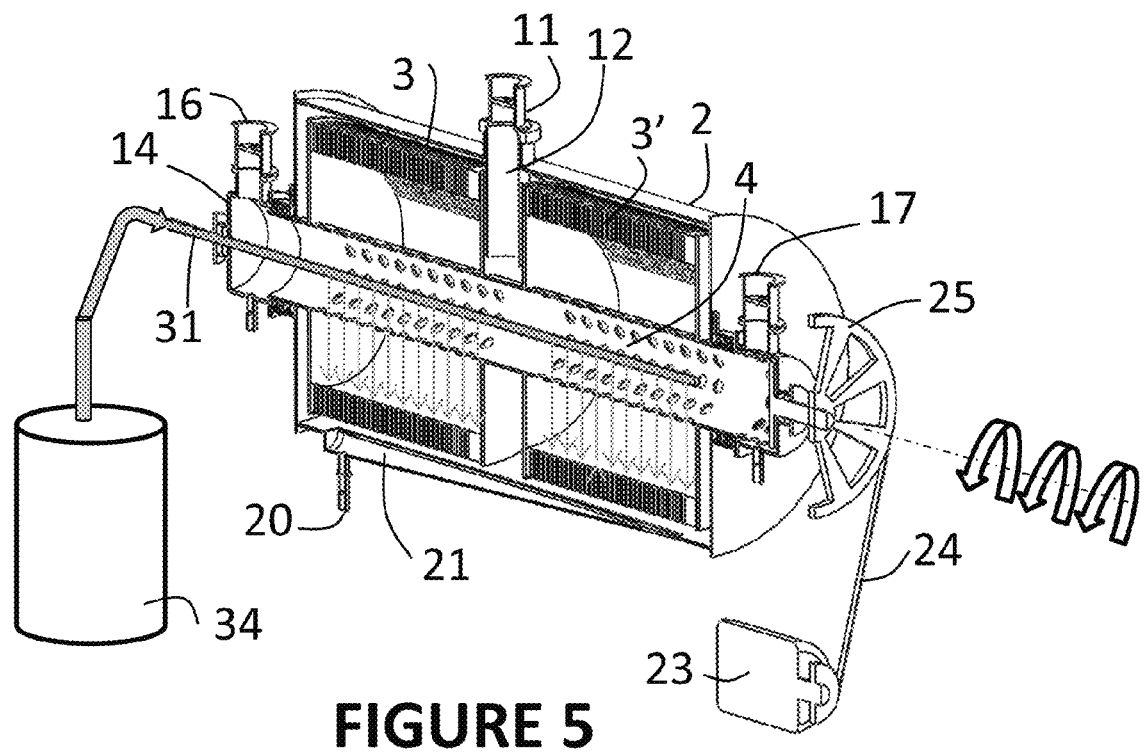
FIG. 5 is cut-away perspective view of the filter assembly showing high-speed rotation of the filter element and delivery of a rinsing liquid to the interior of the filter element.
Figure 6:
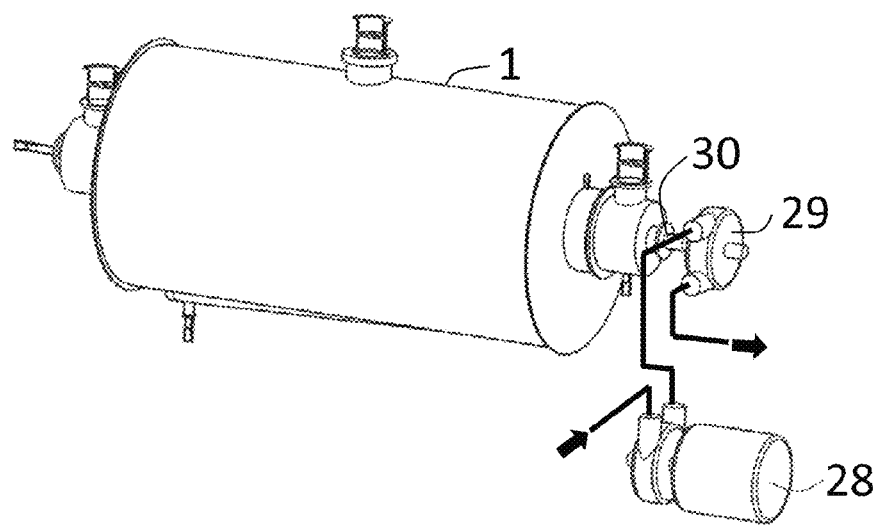
FIG. 6 is a perspective view of the filter assembly in which the combination of a pump and Pelton wheel constitute the motor for rotating the filter element.

Referring to FIG. 5, in one embodiment of the invention, pump 28 provides a flow of liquid to Pelton wheel 29 connected by shaft 30 to mandrel 4. The use of a pump and turbine combination is particularly advantageous to reduce the overall cost of the system and to retrofit the assembly to existing filtration systems. For example, systems for filtering a liquid containing particulate typically require a pump to create the pressure differential to force the liquid through a filter element. During the cleaning and rinsing steps of the present invention, the liquid to be filtered is not introduced into the housing and the pump is idle. With the appropriate valves and controls, the liquid to be filtered can be recirculated through a turbine, to extract the energy to rotate the filter element, while bypassing the cleaning liquid and/or rinsing liquid inside the housing. For example, while the Pelton wheel may be positioned in the housing, the fluid driving the Pelton wheel is isolated from the filter elements. The rotational speed of the filter element can be controlled with a variable speed pump and/or transmission, and a transmission can be employed to alter the direction of rotation.

The agitation step may be a sequence of rotating and soaking the filter element in the cleaning liquid, in order to optimize the removal of particulates and minimize cleaning time, and will vary from application to application. The agitation step may include longitudinal displacement of the filter element, that is, reciprocation from side-to-side, relative to the housing. For example, a one-way sprag clutch may engage a surface having cams or ramps when the filter element is rotated at low speed, to create longitudinal agitation of the filter element. When the filter element is rotated at high speed, for example during rinsing, it may be rotated in an opposite direction, and not engage the clutch.

The rate of rotation of the filter elements in the cleaning liquid, to provide optimum agitation will vary from application to application. Generally, movement of the filter element in the cleaning fluid at a rate of 100 to 400 linear feet per minute has been found to be beneficial.

In an embodiment of the invention, ultrasonic transducer 32 is provided inside housing 2 and outside of the exterior surface of filter elements 3 and 3', where it is submerged in the cleaning liquid. The ultrasonic transducer may be activated when the filter elements are also submerged in the cleaning liquid during soaking and/or during agitation, to assist in removing particulates from the filter elements. The use of ultrasonic energy is particularly useful for microfiltration, that is, removing particulates in the range of 0.1 to 10 µm. Accordingly, the ultrasonic transducer may be advantageously employed when the accumulated particulates on the filter element have a mean particulate size of 5 µm or less, in particular 2 µm or less.

Synergistic benefits in terms of lower energy requirements and greater efficacy in the removal of particulates from the filter elements, can be realized when the level of cleaning liquid is reduced to submerge one-half or less, one-third or less, or even one-fourth or less of the filter element, in combination with the use of one or more ultrasonic transducers.

The cleaning fluid and particulates dislodged from the filter element are then drained from the housing. It is also within the scope of the invention to repeat the cleaning process by providing the same or different cleaning liquid in the housing and agitating the filter element therein, perhaps with a rinsing step in between each treatment in the cleaning liquid.

It can be understood that the volume of cleaning liquid is significantly less in the present invention, relative to the volume of fluid required to backwash a filter element. The benefits include less consumption of relatively expensive cleaning compositions, less liquid sent to waste disposal, and avoiding the loss of filtrate to the cleaning process, such as when filtrate is used to backwash the filters.

Referring to FIG. 5, filter elements 3 and 3' and mandrel 4 are rotated by motor 23, while a rinsing liquid is delivered to the interior of the filter elements via spray bar 31. Spray bar 31 is positioned inside mandrel 4, and optionally, spray bar 31 and mandrel 4 may be aligned co-axially. Spray bar 31 has openings along its length for uniformly delivering the rinsing liquid. In one embodiment, spray bar 31 has nozzles spaced out along its length for atomizing the rinsing liquid. The rinsing liquid collects in trough 21 and is drained from housing 2.

The direction of discharge of the rinsing liquid from spray bar 31, for example, the nozzle direction, can be adjustable so that most of the rinsing liquid passes through the filter element and is flung against the inside of the housing, as the filter element rotates between the uppermost and lowest points of the housing. Thus, it is possible to minimize the possibility of rinsing liquid collecting on the inside of the housing and flowing against the rotation of the filter element. It is within the scope of the invention to adjust the direction of discharge corresponding to the centrifugal force generated by rotation of the filter element, for a given speed.

The rinsing liquid may be an aqueous or organic solvent or mixtures thereof, and may contain, for example, a surfactant, a disinfectant to kill microorganisms, and/or a defoaming agent. The rinsing liquid may have a different composition than the filtrate. In instances when the cleaning liquid employed in an earlier step is an acid or base for dissolving or softening particulates accumulated on the filter element, the rinsing liquid may contain a compound to neutralize the cleaning liquid retained on the filter element. It is also within the scope of the present invention to deliver a sequence of two or more different rinsing liquids to the filter element, during the rinsing step. For example, a surfactant solution, a disinfectant solution and clean water may be delivered in sequence, to prepare the filter element for filtration.

Rinsing may be accompanied by or followed by a charge of compressed gas delivered to the interior of the filter element, to force retained rinsing liquid from the filter element and/or to displace volatile compounds in the housing. In one embodiment, the rinsing step may include delivery of a readily evaporated rinsing liquid, which displaces liquids absorbed by the filter element, followed by delivery of a gas to evaporate the rinsing liquid, leaving the filter element dry. The housing may also be purged of any undesirable gases, for example, with a vacuum pump or by injecting an inert gas.

The rate of rotation of the filter element to generate sufficient centrifugal force to drive the rinsing liquid from the interior to exterior surface of the filter element will vary depending upon the diameter of the filter element, as well as the material of construction. Filter element speeds of 850 to 3,000 linear feet per minute have been found to be beneficial in achieving the objectives of the present invention. A flywheel may also be provided with the filter assembly, for example, on shaft 27, to aid in maintaining uniform angular velocity and/or to store energy.

Pipes, valves and instrumentation to practice the subject invention are provided, as is known to those skilled in the art. The filter assembly also includes cleaning liquid reservoir 33 and rinsing liquid reservoir 34, shown in FIGS. 3 and 4, respectively. The filtration and self-cleaning processes disclosed herein may be conducted in an inert environment, for example, under nitrogen, as desired.

Figure 7:
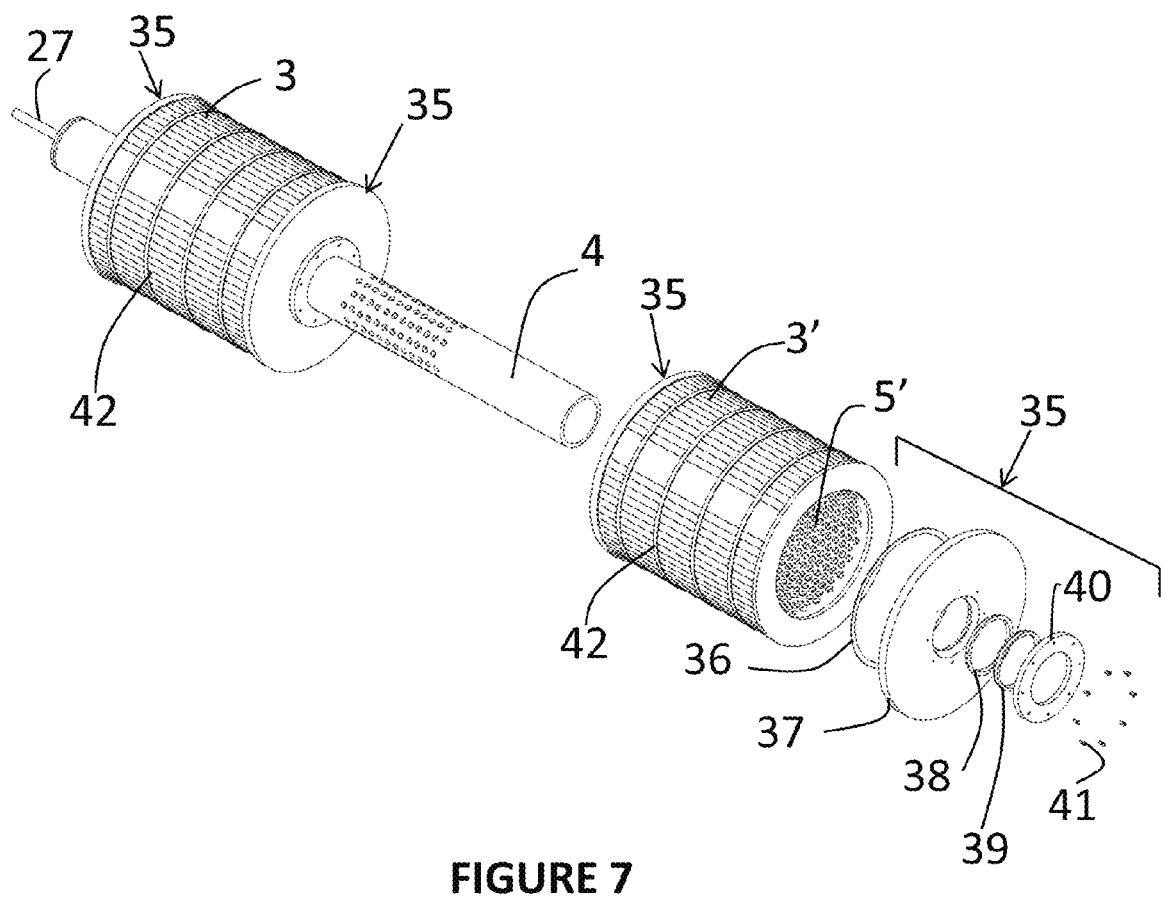
FIG. 7 is an exploded perspective view of the hardware for securing the filter element to the mandrel.

Referring to FIG. 7, drive plate assembly 35, for securing filter elements 3 and 3' to mandrel 4 is shown. The drive plate assembly 35 has a gasket 36 positioned between each end of the filter element and drive plate 37. Drive plate 37 is securely mounted on mandrel 4 and a seal is created by gasket 38. Gasket 38 is forced against drive plate 37 and mandrel 4 by retainer ring 39 and retainer plate 40, when bolts 41 are screwed into drive plate 37. Good results are achieved when gasket 36 is compressed between an end of the filter element and drive plate 37, while retainer plate 40 is tightened into place, thereby compressing gasket 38.

The ends of the filter element and the face of drive plate 37 may be provided with means to interlock the parts or increase frictional engagement, such as providing matching lugs and recesses. Alternatively, drive plate 37 may be integrally attached to the filter element and core, such as by binding the components with a suitable polymer.

The drive plate assembly functions to center filter elements 3 and 3' on mandrel 4, create a seal between the filter elements and the mandrel, and couple the filter element and mandrel together, so that movement of the mandrel (rotational and/or longitudinal displacement) is transferred to the filter elements.

Also shown in FIG. 7 are bands 42, which maintain the integrity of the filter elements, when the filter elements are rotated at high speed to create centrifugal force during self-cleaning. Bands 42 are particularly useful in conjunction with a pleated filter element. In addition to bands 42, other means to maintain the integrity of the filter element during high speed rotation include a screen or perforated shell around the filter element.

The subject invention is not limited for use with a particular type of particulate, and is useful in virtually any solid-fluid system, where a solid particulate may be separated from a fluid by filtration. Examples of applications include: pools and spas, cooling towers, water purification and treatment, municipal waste water treatment, irrigation systems, car wash re-cycling systems, oil and lubricant filtration, water intake for industrial equipment and engines, chemical processing, food production, as well as a pre-filtration treatment in water treatment systems employing membranes.

The invention also has applications in chemical manufacturing, wherein the particulates filtered from the fluid are recovered as an intermediate or final product. By way of example, in chemical syntheses, it is often useful to purify an intermediate by precipitation and filtration, followed by dissolution of the precipitate in a solvent. The apparatus and method disclosed herein may be used to filter a fluid containing a desired precipitate, followed by in situ dissolution of the precipitate in a suitable solvent, wherein the solvent is substituted for a cleaning liquid, during the agitation step. The rinsing liquid delivered during rotation of the filter element may also be a solvent capable of dissolving the precipitate, to increase the yield of precipitate. Accordingly, it is possible to avoid solid material handling and multiple processing steps, such as isolating the precipitate, transferring the precipitate to another vessel and dissolving the precipitate in a suitable solvent.

The invention may be further understood by reference to the following claims.

What I claim is:

1. An apparatus for filtering a fluid containing particulates to produce a filtrate, comprising:
    (a) a housing;
    (b) a first hollow core filter element positioned inside the housing, wherein the filter element has an exterior surface facing the housing and an interior surface;
    (c) a perforated, hollow mandrel extending along an axis of the filter element and rotatably mounted in the housing, wherein the filter element is mounted on the mandrel and rotatable therewith;
    (d) a discharge manifold in fluid communication with an end of the mandrel, for receiving the filtrate that passes from the exterior surface of the filter element through the filter element and the mandrel;
    (e) an inlet manifold for introducing an unfiltered fluid into the housing and outside the exterior surface of the filter element;
    (f) a motor mechanically linked to the mandrel for rotating the mandrel and filter element relative to the housing; and
    (g) a means for delivering a rinsing liquid to the interior surface of the filter element while the filter element is rotating, whereby the rinsing liquid is introduced inside the mandrel.

2. The apparatus according to claim 1, wherein the rinsing liquid delivery means is a spray bar positioned inside the mandrel and extending the length of the filter element.

3. The apparatus according to claim 2, wherein the spray bar is stationary relative to the housing, when the spray bar delivers the rinsing liquid.

4. The apparatus according to claim 1, wherein the filter element is cylindrical and the filter element and mandrel are co-axially aligned in a horizontal orientation.

5. The apparatus according to claim 4, wherein at least a lower half of the housing is cylindrical and the housing further comprises an inclined trough incorporated therein for draining the housing.

6. The apparatus according to claim 4, further comprising a second hollow core filter element mounted co-axially on the mandrel, wherein the first and second filter elements are spaced apart on the mandrel, and when the inlet manifold directs the fluid to be filtered between the first and second filter elements.

7. The apparatus according to claim 1, further comprising an ultrasonic transducer, wherein the ultrasonic transducer is positioned inside a lower half of housing and outside the exterior surface of the filter element.

8. The apparatus according to claim 1, wherein the motor is positioned outside of the housing.

9. The apparatus according to claim 1, further comprising a cleaning liquid reservoir and means to introduce the cleaning liquid inside the housing, whereby the filter element is at least partially submerged in the cleaning liquid, and wherein the cleaning liquid has a different composition than the fluid being filtered and the filtrate.

10. The apparatus according to claim 9, further comprising a rinsing liquid reservoir, wherein the reservoir is in fluid communication with the rinsing liquid delivery means, and wherein the rinsing liquid has a different composition than the filtrate and the cleaning liquid.

11. The apparatus according to claim 1, further comprising a seal encircling the mandrel for sealing between the mandrel and housing, wherein the seal is selected from the group consisting of hydraulic and pneumatic pressurized seals.

12. An apparatus for filtering a fluid containing particulates to produce a filtrate, comprising:
    (a) a housing;
    (b) a filter element positioned inside the housing, wherein the filter element has an exterior surface facing the housing, an interior surface and a perforated, hollow core;
    (c) a mount to support the filter element inside the housing, whereby the filter element can be rotated relative to the housing;

(d) a discharge manifold in fluid communication with the inside of the filter element for receiving the filtrate that passes from the exterior surface of the filter element through the filter element;

(e) an inlet manifold for introducing an unfiltered fluid into the housing and outside the exterior surface of the filter element;

(f) a motor, positioned outside of the housing and mechanically linked to the filter element, for rotating the filter element relative to the housing; and (g) a spray bar positioned inside the core of the filter element and extending substantially the length of the filter element, which is capable of delivering a rinsing liquid to the interior surface of the filter element while the filter element is rotating.

13. The apparatus of claim 12, wherein the spray bar is stationary relative to the housing, when the spray bar delivers the rinsing liquid.

14. The apparatus of claim 13, wherein the filter element is cylindrical and at least a lower half of the housing is cylindrical, and the filter element and the housing are aligned in a horizontal orientation.

15. The apparatus of claim 14, wherein the lower half of the housing comprises an inclined trough incorporated therein for draining the housing.

16. The apparatus of claim 14, further comprising an ultrasonic transducer positioned inside the lower half of the housing and outside the exterior surface of the filter element.

17. The apparatus according to claim 12, further comprising a cleaning liquid reservoir and means to introduce the cleaning liquid inside the housing, whereby the filter element is at least partially submerged in the cleaning liquid, and wherein the cleaning liquid has a different composition than the fluid being filtered and the filtrate.

18. The apparatus according to claim 17, further comprising a rinsing liquid reservoir, wherein the reservoir is in fluid communication with the rinsing liquid delivery means, and wherein the rinsing liquid has a different composition than the filtrate and the cleaning liquid.

19. An apparatus for filtering a fluid containing particulates to produce a filtrate, comprising:

(a) a housing;

(b) a filter element positioned inside the housing and aligned horizontally, wherein the filter element has an exterior surface facing the housing, an interior surface and a hollow core;

(c) a mount to support the filter element inside the housing, whereby the filter element can be rotated relative to the housing;

(d) a discharge manifold in fluid communication with the inside of the filter element for receiving the filtrate that passes from the exterior surface of the filter element through the filter element;

(e) an inlet manifold for introducing an unfiltered fluid into the housing and outside the exterior surface of the filter element;

(f) a motor, positioned outside of the housing and mechanically linked to the filter element, for rotating the filter element relative to the housing;

(g) a manifold for delivering a rinsing liquid to the interior surface of the filter element while the filter element is rotating, whereby the rinsing liquid is introduced inside the core of the filter element; and (h) a cleaning liquid reservoir and manifold to introduce the cleaning liquid inside the housing, whereby the filter element is at least partially submerged in the cleaning liquid, and wherein the cleaning liquid has a different composition than the fluid being filtered and the filtrate.

20. The apparatus of claim 19, wherein the cleaning liquid is present in the housing and one-half or less of the filter element is submerged in the cleaning liquid.

* * * * *